No. 750,856. PATENTED FEB. 2, 1904.
H. H. HOUGHLAND.
DEVICE FOR THINNING BEETS.
APPLICATION FILED JUNE 19, 1903.
NO MODEL.
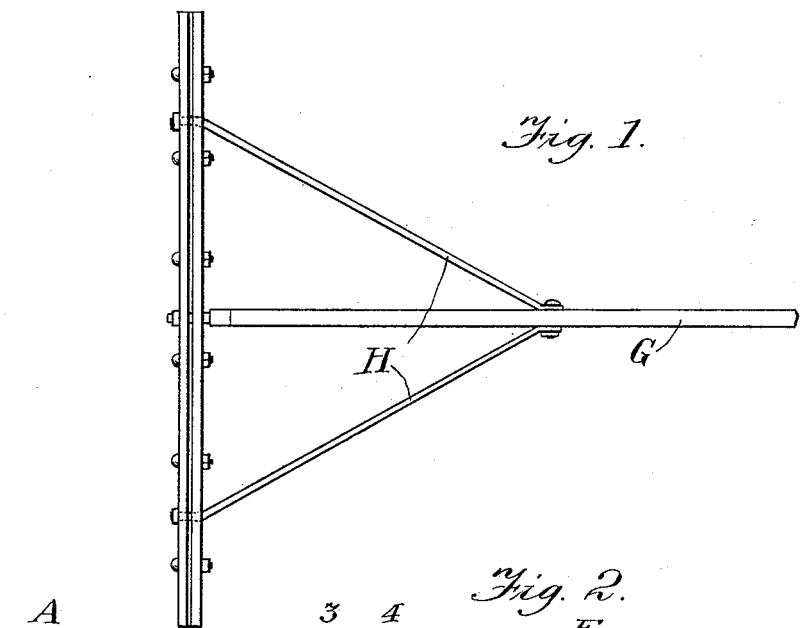
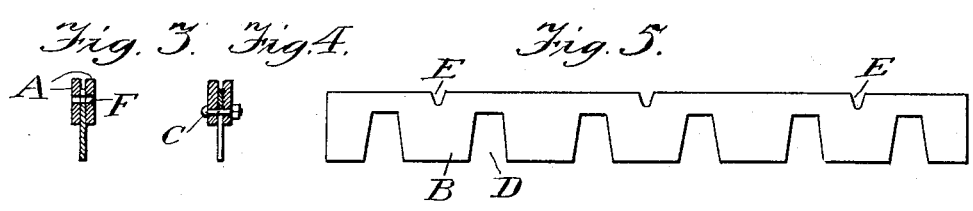
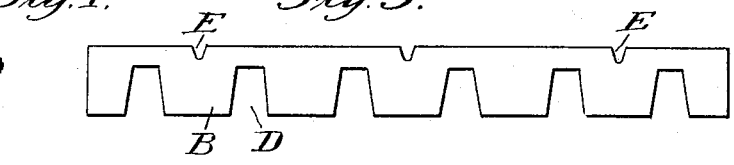
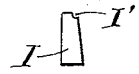
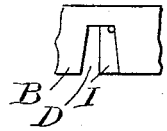
Witnesses:
H. B. Hallock
L. H. Morrison
Inventor:
Harvey H. Hougland
By
W. Paulson Williamson, Atty No. 750,856. Patented February 2, 1904.

UNITED STATES PATENT OFFICE.

HARVEY H. HOUGLAND, OF CEDAR RAPIDS, NEBRASKA.

DEVICE FOR THINNING BEETS.

SPECIFICATION forming part of Letters Patent No. 750,856, dated February 2, 1904.

Application filed June 19, 1903. Serial No. 162,204. (No model.)

*To all whom it may concern:*

Be it known that I, HARVEY H. HOUGLAND, a citizen of the United States, residing at Cedar Rapids, county of Boone, and State of Nebraska, have invented a certain new and useful Improvement in Devices for Thinning Beets, of which the following is a specification.

My invention relates to a new and useful improvement in devices for thinning beets, and I have for my object to provide a simple, durable, but efficient device by which beets may be thinned out, so as to allow for their proper growth.

With this end in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a plan view of the device; Fig. 2, a rear elevation; Fig. 3, a section on the line 3 3 of Fig. 2; Fig. 4, a section on the line 4 4 of Fig. 2; Fig. 5, a section of the notched blade; Fig. 6, an elevation of one of the sectional blades; Fig. 7, an elevation showing one of the sectional blades in place.

In order to get the proper stand for sugar-beets, the seed is sown or drilled very close together, and then after this seed begins to grow it is necessary to thin out the beets in rows, so as to allow for the proper growth of the same. This is generally a long, laborious, and tedious operation when it is done with a hoe or like article. My invention is for the purpose of accomplishing this work with a simple hand instrument in a shorter space of time.

A represents a clamp which consists of two bars arranged parallel with one another, and between these two bars is adapted to be held the notched blade B. Bolts C pass through the clamp A and also through the notches D in the blade, thereby clamping this blade securely in place. The upper surface of the blade B is provided with notches E, which are adapted to register with holes F, formed through the clamp, and through these holes F and notches E are adapted to extend the ends of the handle G and angle-braces H.

In operation this device is adapted to be dragged over the beets first in one direction, then in another, and all of the small beet-plants will be uprooted, except where the notches D occur, and thus by dragging the implement across the field at right angles the beets will be left in tufts or stands which will be in rows each way of the field.

It may be desirable at times not to leave so many stands or tufts, and therefore it would be necessary to narrow the notches D. In order to do this, I provide sectional blades I, which are made in different widths and may be fitted in the notches D and the upper end clamped in the clamp, one corner of the sectional blades, as represented at I', being cut away to fit around the bolt C. Thus the notches can be made any width desired.

Of course I do not wish to be limited to the exact construction here shown, as slight modifications could be made without departing from the spirit of my invention.

Having thus fully described my invention, what I claim as new and useful is—

1. In a device of the character described, a clamp consisting of two bars arranged parallel with one another, a blade provided with notches arranged at regular intervals extending upward from the lower edge to a point near the upper edge, the upper edge of the blade and the upper end of the notches in the blade adapted to lie between the bars, bolts passing through the bars and also through one of the upper corners of each notch in the blade, nuts threaded upon the bolts adapted to clamp the blade in the clamp, sectional blades adapted to be placed in the notches to reduce the size of said notches, and means for holding said sectional blades in place, a handle and braces secured to the clamp, as and for the purpose specified.

2. In a device of the character described, a clamp consisting of two bars arranged parallel with one another, a thin blade notched at regular intervals, the notches extending upward from the lower edge of the blade, to a point near the upper edge, the upper edge of the blade and a portion of the notches adapted to lie between the bars, bolts passing through the bars and blade, and nuts threaded upon the bolts adapted to clamp the blade in place, sectional blades adapted to fit within the notches of the notched blade for the purpose of reducing the size of the notches, the upper end of the sectional blades adapted to be clamped in place by the clamp, and a handle and brace-rods secured to the clamp, as specified.

In testimony whereof I have hereunto affixed my signature in the presence of two subscribing witnesses.

HARVEY H. HOUGLAND.

Witnesses:
  C. C. GOODRICH,
  A. A. BENHAM.